United States Patent Office 3,165,532
Patented Jan. 12, 1965

3,165,532
HEMIACETAL ESTER PRODUCTION
William J. Farrissey, Jr., Baytown, Tex., assignor, by mesne assignments, to Esso Research and Engineering Company, Elizabeth, N.J., a corporation of Delaware
No Drawing. Filed June 14, 1961, Ser. No. 116,942
12 Claims. (Cl. 260—333)

The present invention relates to the production of hemiacetal esters by the concurrent esterification and rearrangement of hydroperoxides in a substantially water-free environment.

Prior to the discovery of the present invention, hemiacetal esters in general have been produced only with extreme difficulty by the decomposition of the peresters of the corresponding hydrocarbons. By the practice of the present invention, the preparation of the peresters is avoided. The peresters are only difficultly obtained and are expensive and uneconomical as the starting materials for the hemiacetal esters. Further, by the practice of the present invention, a group of novel hemiacetal esters may be prepared which have not been produced by the decomposition of peresters.

Hemiacetal esters in general find utility in the production of polymerizable materials. The cyclic hemiacetal ester may be hydrolyzed to the dialdehyde form and polymerized by means of the aldehyde linkages, or it may be oxidized to the acid or salt and polymerized through an intervening vinyl linkage; alternatively, the acids may be polymerized through the acid function. Also, the hemiacetal esters may themselves be polymerized.

The nature of concurrent esterification and rearrangement of the hydroperoxides by the practice of the present invention may be better understood by comparison with thermal (radical) decomposition. Upon the thermal decomposition of the hydroperoxide, either in the undiluted form or in a nonreactive solvent medium, the hydroperoxide yields a mixed product of an aldehyde, alcohol and/or acid form, which corresponds to the hydroperoxide starting material. It would be expected that the decomposition of a hydroperoxide in a reactive (acid) medium would result in not only the esterification of selected alcoholic decomposition products, but also in the fragmentation of the hydroperoxide itself. Surprisingly, it has now been found that by maintaining the esterification-rearrangement reaction in a substantially water-free medium and by maintaining the temperature below that point at which the thermal decomposition becomes prevalent, the fragmentation which ordinarily would be expected is not in fact encountered.

It has been found that by drying the charge materials, that is the hydroperoxide and the acid, before the initiation of the reaction, the hydrolysis and fragmentation of the hydroperoxidic structure is substantially avoided, even though a small amount of water is evolved in the esterification reaction. Thus, the reactants as charged would be a dried, substantially water-free hydroperoxide and a dried, substantially water-free carboxylic acid. In this regard, the use of the acid in amounts greater than stoichiometric aids in the minimizing of the hydrolysis reaction in providing a diluent for the water which is evolved. The use of the acid as a solvent, that is in quantities in an order of magnitude greater than stoichiometric, has proven to be effective in minimizing the hydrolysis reaction. Alternatively, an inert absorbent may be maintained in the reaction zone to remove water as it is formed. This absorbent may be in the granular form and may be composed of sodium sulfate, calcium sulfate, etc. It is also contemplated that substances such as $P_2O_5$ may be used to catalyze the rearrangement as well as absorbing the water of reaction.

The combination esterification-rearrangement reaction may be accomplished at temperatures between about 25° C. and about 130° C., with better yields being obtained at the lower temperatures. The use of lower temperatures favors higher yields and minimizes the thermal decomposition and hydrolysis reactions. At the lower temperatures, however, the rate of reaction is reduced. Therefore, a temperature range of about 75° C. to about 100° C. is preferred. The pressure of the system is not critical since the reaction is carried out in the liquid phase.

In the preparation of the hemiacetal esters, suitable feed stocks are the hydroperoxides of aliphatic olefins such as isobutylene, isoamylene, butene-1, the hydroperoxides of cyclic olefins such as a vinyl cyclohexene, cyclohexene, cycloheptene, etc., and the hydroperoxides of aromatic hydrocarbons such as toluene, xylenes, mesitylene, isodurene, etc. Paraffinic hydroperoxides, however, are unsuitable because the rearrangement cannot be accomplished. Suitable acids for carrying out the esterification-rearrangement reaction may be chosen from the organic aliphatic acids such as formic acid, acetic acid, propionic acid, etc., also including the substituted aliphatic acids such as isobutyric acid, etc., and the aromatic acids such as benzoic acid, naphthoic acid and substituted aromatic acids such as mesitoic acid. The length of the chain and/or substituents is not critical and, in general, any weak carboxylic acid (an acid which does not ionize greatly) will be suitable. Stronger acids will promote hydrolysis of the hemiacetal ester and should be avoided. Therefore, the use of acids such as sulfuric, nitric, hydrochloric, phosphoric, trichloroacetic, etc., is not contemplated. The volatility of the hemiacetal ester, which is important in determining the length of time that the ester may be kept as an antioxidant within a system, may be controlled by selecting the acid from a less volatile group such as, for instance, the benzoic acids.

The general reaction may be visualized as $$RCH_2OOH + R'\overset{O}{\underset{\|}{C}}-OH \longrightarrow R-O-CH_2-O-\overset{O}{\underset{\|}{C}}-R' + H_2O$$

where R is an alkenyl and R' is an alkyl group.

The hydroperoxide feed stock may suitably be formed by the uncatalyzed atmospheric oxidation of the desired material by contacting the material with pure oxygen or with air at moderate temperatures. An initiator such as ditertiary butyl peroxide may be used. In the oxidation of p-xylene, for example, atmospheric pressure and a temperature between 110° C. and 130° C. will be utilized while contacting the liquid mixture with between 50 and 500 ml./min. of pure oxygen until the oxidation is complete. The peroxide may be recovered from the reaction products by caustic extraction followed by partial acidification with $CO_2$ (to pH 8.5) and followed by re-extraction with diethyl ether, the solution being dried over sodium sulfate. The incomplete acidification is utilized to prevent acid promoted decomposition of the hydroperoxide. The acid to be used in the combination reaction is also dried before admission into the reactor.

The novel hemiacetal esters which are produced by the practice of the present invention are formed by the interaction of p-methylbenzyl hydroperoxide or isoduryl hydroperoxide with acetic or benzoic acid of the form:

$ArOCH_2OR$, where AR is

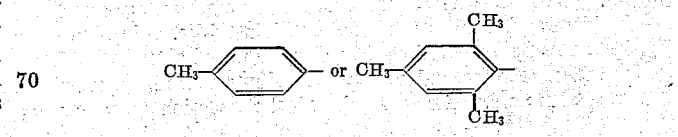

and R is

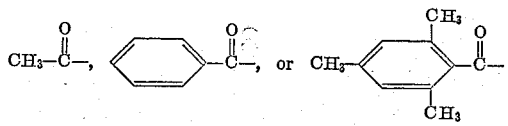

The reaction may be visualized as:

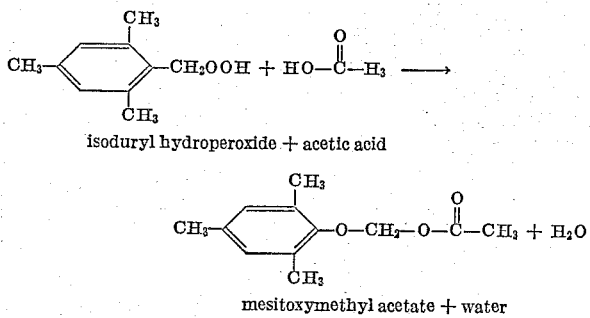

isoduryl hydroperoxide + acetic acid

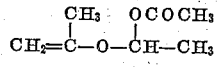

mesitoxymethyl acetate + water

The resulting hemiacetal esters find utility in the production of oxidation inhibitors. The hemiacetal esters may be hydrolyzed to the inhibitor form, and the ability to yield the inhibitor upon hydrolysis enables the inclusion of these materials in a substantially non-aqueous medium to provide a continuing supply of oxidation inhibitor throughout an extended period. For instance, the hemiacetal ester prepared by the present process might be incorporated into a polymer such as polyethylene or polypropylene, with the inhibitor being gradually released upon hydrolysis of the hemiactal ester.

As exemplary of the practice of the present invention, the following runs were made.

Example I

A charge of 2-methyl-3-hydroperoxy butene-1 is admixed with 10 ml. of acetic acid and heated to a temperature of 75° C. The admixture is maintained at this temperature for 48 hours at which time the reaction is complete. The product obtained is

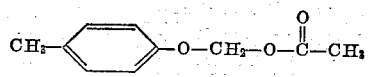

which is useful as a monomer for polymerization, through the olefin function with cross-linkages being obtained through the ester function. The resulting polymer may be used to form articles by molding or may be formed by extrusion into fibers for textile weaving, etc.

Example II

A solution of 5.23 g. of p-methylbenzyl hydroperoxide in 50 ml. of acetic acid was heated to 75° C. in an oil bath. After about 24 hours the solution was diluted with water and extracted with methylene chloride. Evaporation of solvent gave 5.38 g. of a yellow oil which was freed from aldehyde by precipitation of the semicarbazone and washed free of p-cresol with dilute caustic. The residue, 2.26 g., was shown by nuclear magnetic resonance (NMR) spectroscopy to be essentially p-cresoxymethyl acetate,

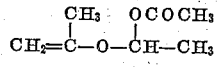

Mass spectrography, infrared analysis, and saponification equivalent were in agreement with this structure. The compound has utility as an anti-oxidant, as hereinbefore set out.

Example III

A charge of dried benzoic acid (980 mg.) and isoduryl hydroperoxide (690 mg.) dissolved in 25 cc. chlorobenzene was heated to 128–132° C. without catalyst for 165 minutes. At the end of the 165 minute period, reaction was complete. An analysis of the reaction products showed 70 mg. of the benzoic ester with a melting point of 72–73° C. Infrared NMR and mass spectrographic analysis of the product were in accordance with the formula:

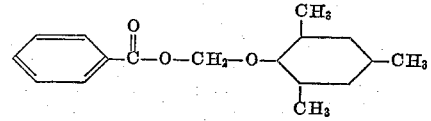

This is mesitoxy methyl benzoate, a white crystalline solid which exhibited a carbon-hydrogen analysis in agreement with the proposed structure. Calculated for the formula $C_{17}H_{18}O_3$: C, 75.53; H, 6.71; O, 17.76. Found: C, 75.64; H, 6.95; O, 17.41. The compound may be used as an antioxidant, as set forth supra.

Example IV

The decomposition of 0.8 g. of isoduryl hydroperoxide in 10 ml. acetic acid at 100° C. for 16 hours gave a product containing the ester

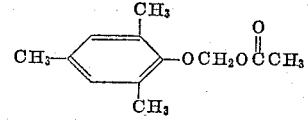

in about 30% yield. Infrared and mass spectral data are in accord for this structure. This compound is useful as an antioxidant, as set forth in the specification.

Example V

From 162.1 mg. of isoduryl hydroperoxide and 99.9 mg. of mesitoic acid heated to 151–158° C. for 1 hour were obtained, after extraction with sodium bicarbonate solution, 150 mg. of product. Greater than 50% of this material is an ester whose infrared and mass spectra indicate the following structure:

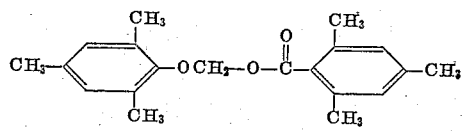

mesitoxy methyl mesitoate

This compound is useful as an anti-oxidant, as set forth supra.

Example VI

From 2.76 g. of p-methylbenzyl hydroperoxide in 75.0 ml. of chlorobenzene heated for 4½ hours at 130° C. there was obtained a small yield (1–2%) of an ester of structure

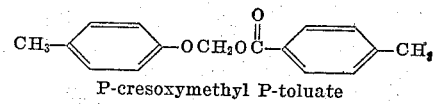

P-cresoxymethyl P-toluate

The p-toluic acid in this example is formed by the decomposition of the hydroperoxide. Reaction of this acid with more hydroperoxide produces the final product. This compound is useful as an anti-oxidant, as set forth in the specification.

Example VII

The decomposition of 1.0 g. of 4-vinylcyclohexenyl hydroperoxide (a mixture of isomers, including 3-hydroperoxy-5-vinylcyclohexene) in 10 ml. of acetic acid at 78–79° C. for 27½ hours gives a product which is largely acetate ester including the structure:

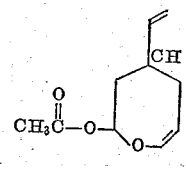

Applicant having set forth in detail the essence of the present invention, and having disclosed a preferred manner of practicing the invention and set forth the best mode thereof, what is desired to be protected by Letters Patent should be determined not by the specific examples given, but only by the appended claims.

I claim:

1. A compound of the formula ArOCH$_2$OR wherein Ar is chosen from the group consisting of p-toluyl and isoduryl and R is chosen from the group consisting of acetyl, benzoyl, p-toluyl and mesitoyl.

2.

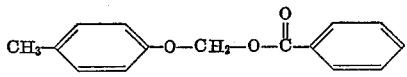

3.

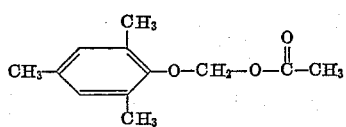

4.

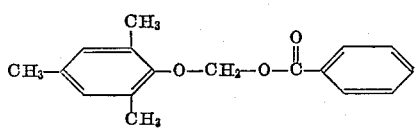

5.

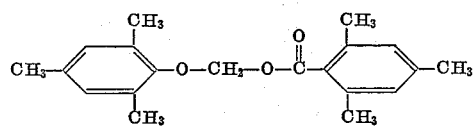

6.

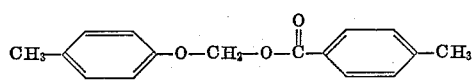

7. A method of producing a hemiacetal ester which comprises
reacting a dried, substantially water-free hydroperoxide selected from the group consisting of primary and secondary hydroperoxides of aliphatic olefins, cyclic olefins, and aromatic hydrocarbons
with a dried, substantially water-free, weak carboxylic acid selected from the group consisting of formic acid, acetic acid, propionic acid, isobutyric acid, benzoic acid, naphthoic acid, and mesitoic acid
at a temperature within the range of 25° C. to 130° C.

8. A method in accordance with claim 7 wherein the temperature is within the range of about 75° C. to about 100° C.

9. A method in accordance with claim 7 wherein the acid is in stoichiometric excess.

10. A method of producing a hemiacetal ester which comprises reacting dried, substantially water-free p-methylbenzyl hydroperoxide with dried, substantially water-free acetic acid at a temperature within the range from 25° C. to 130° C.

11. A method of producing a hemiacetal ester which comprises reacting dried, substantially water-free 3-hydroperoxy-5-vinyl cyclohexene with dried, substantially water-free acetic acid at a temperature within the range of 25° C. to 130° C.

12. A method of producing a hemiacetal ester which comprises reacting dried, substantially water-free 2-methyl-3-hydroperoxy butene-1 with dried, substantially water-free acetic acid at a temperature within the range of 25° C. to 130° C.

References Cited in the file of this patent

UNITED STATES PATENTS

| | | |
|---|---|---|
| 2,260,740 | Coleman et al. | Oct. 28, 1941 |
| 2,344,491 | Britton et al. | Mar. 21, 1944 |
| 2,847,456 | Hurd | Aug. 12, 1958 |

OTHER REFERENCES

Wieland et al.: Ber. Deut. Chem., volume 64, pages 1205–10 (1931).

Gupta et al.: Chemical Abstracts, volume 36, page 5461 (1942).

Houben-Weyl: Methoden der Organischen Chemie, vol. VIII (Stuttgart, 1952, 4th ed.), pages 64–66.

Fieser et al.: Organic Chemistry (Boston, 1958), pages 671–3, 658.